United States Patent Office 2,913,462
Patented Nov. 17, 1959

2,913,462

PRODUCTION OF COMPOUNDS OF THE PYRIMIDINE SERIES

Hermann Spaenig and August Weickmann, Ludwigshafen (Rhine), Germany, assignors to Badische Anilin- & Soda-Fabrik Aktiengesellschaft, Ludwigshafen (Rhine), Germany No Drawing. Application June 1, 1956
Serial No. 588,625

Claims priority, application Germany June 3, 1955

11 Claims. (Cl. 260—256.4)

This invention relates to an improved process for the production of compounds of the pyrimidine series.

It has already been proposed to prepare 2-aminopyrimidines by reacting alpha-acetylene aldehydes or ketones with guanidine or its salts. This method is unsatisfactory, however, by reason of the instability of the said acetylene derivatives.

We have now found that compounds of the pyrimidine series are obtained in a technically advantageous manner by first adding the said aldehydes or ketones of the acetylene series on to aromatic hydroxy compounds and then reacting the resultant beta-aryloxyvingyl-alpha-aldehydes or -ketones with compounds of the general formula $R-C(=NH)-NH_2$ or their salts, in which R represents hydrogen or an alkyl, aryl or sulfhydryl group or a free amino group or an amino group substituted by an alkyl, aryl, acyl or sulfonyl radical.

The reactions may be formulated as follows when using propargylaldehyde, phenol and guanidine as initial materials:

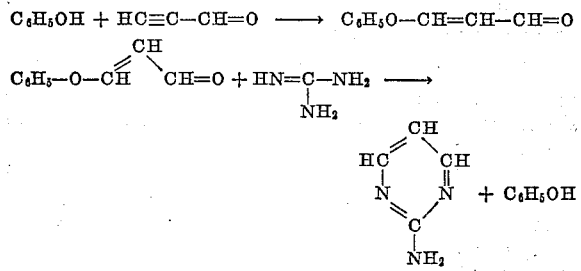

Suitable alpha-acetylene aldehydes or ketones, in addition to propargylaldehyde, are for example butine-(1)-one-(3), pentine-(2)-one-(4), 3-phenylpropine-(1)-one-(3), 1-phenylbutine-(1)-one-(3) and heptine-(2)-al-(1).

As aromatic hydroxy compounds which in the first step of the reaction are added on to the said alpha-acetylene aldehydes or ketones there may be mentioned for example, in addition to phenol, the cresols and xylenols, the naphthols and their halogen, nitro, hydroxy and/or dimethylamino derivatives. The reaction usually takes place in the presence of a small amount, for example of from about 0.1 to 10 percent by weight (with reference to the acetylenic compound used) of an organic tertiary base, such as pyridine, triethylamine or N.N-dimethylaniline, at room temperature sufficiently rapidly and completely; frequently the heat developed must be withdrawn by cooling. The reaction can be carried out in solution or dispersion in inert solvents, such as water, alcohols, ethers or hydrocarbons.

As compounds of the general formula

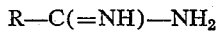

which are to be reacted in the second step of our process with the beta-aryloxyvinyl aldehydes and ketones, resultant from the first step, there come into question not only guanidine but also for example formamidine, acetamidine, benzamidine, thiourea, p-amino- and p-acet-amino-benzene sulfonyl guanidine and its salts, for instance their hydrohalides, sulfates, phosphates or carbonates.

The second step of our process is preferably carried out by allowing equivalent amounts of the components to act on each other preferably in aqueous or alcoholic medium in the presence of an alkaline or acid condensing agent. Suitable alkaline condensing agents are f.i. alkali metal hydroxides and the alkali metal alcoholates of lower saturated alcohols. These alkaline compounds combine with the aromatic hydroxy compound split off and any acid combined like a salt with the compound $R-C(=NH)-NH_2$. The reaction takes place rapidly and with good yields even at room or moderately raised temperature. The aromatic hydroxy compound thereby split off as phenolate can be reacted afresh with an alpha-acetylene aldehyde or ketone.

The second step of our process can also be carried out in strongly acid medium, for example in 80 to 100 percent sulfuric acid, at ordinary temperature up to about 70° C., and in this case the aromatic hydroxy compound is split off in the free form and may likewise be used again.

The pyrimidine derivatives readily accessible in the said manner are valuable intermediate products for medicaments; some of them have themselves pharmacological action known in the art.

The following examples will further illustrate this invention but the invention is not restricted to these examples. The parts specified are parts by weight.

Example 1

The vapor of 224 parts of propargylaldehyde, which is evolved from propargyl alcohol by oxidation with chromosulfuric acid at reduced pressure, is led into a solution of 470 parts of phenol and 10 parts of pyridine or triethylamine in 1000 parts of water. The mixture heats up spontaneously and care is taken by cooling that the temperature does not rise above 40° C. The aqueous layer is then separated off, the oily layer dried and subjected to fractional distillation at reduced pressure. 450 parts of beta-phenoxyacrolein of the boiling point 130° C. at 11 Torr are obtained.

148 parts of this aldehyde are allowed to flow rapidly while stirring well into a solution, cooled to 15° C., of 80 parts of sodium hydroxide and 90 parts of guanidine carbonate in 568 parts of water, the temperature being prevented by cooling from rising above 40° C. After about 30 minutes the temperature begins to fall. It is stirred for a further hour at room temperature and then another 40 parts of sodium hydroxide are added and the product extracted with methylene chloride. By evaporating the methylene chloride there are obtained 56 parts of 2-aminopyrimidine of the melting point 130° to 131° C.

Example 2

120 parts of guanidine hydrochloride are introduced into a solution of 128 parts of sodium hydroxide in 172 parts of water. Impurities remaining undissolved are filtered off by suction and into the filtrate in the course of about 1½ hours there is stirred a solution of 148 parts of beta-phenoxyacrolein (prepared as described in Example 1) in 500 parts of methylene chloride. The mixture, with the addition of a further 500 parts of methylene chloride, is then introduced into a continuosly-operating extraction apparatus and exhaustively extracted. After evaporating the methylene chloride there remain behind 73 parts of crude 2-aminopyrimidine which by trituration or recrystallization from toluene yields 58 parts of pure 2-aminopyrimidine of the melting point 130° to 132° C.

Instead of beta-phenoxyacrolein there can be used in an analogous manner methylene chloride solutions or suspensions of 182.6 parts of beta-(para-chlorphenoxy)-acrolein (melting point 77° C.) or 109 parts of hydroquinone-bis(-beta - aldehydovinyl) - ether (melting point 210° C.) or 193.2 parts of beta-(para-nitrophenoxy)-acrolein (melting point 118° C.) which may be prepared in an analogous manner to that described in the first paragraph of Example 1.

*Example 3*

120 parts of guanidine hydrochloride are suspended in a solution of 120 parts of sodium methylate in 400 parts of methanol while stirring. Into the mixture heated to 60° C. there are then allowed to flow 148 parts of beta-phenoxyacrolein (prepared as described in Example 1) and the whole is further stirred at this temperature for 12 hours. The deposited sodium chloride is filtered off by suction, the methyl alcohol is removed by blowing in steam, the distillation residue is weakly acidified with dilute hydrochloric acid, and the precipitated phenol is distilled off with steam. The solution then remaining is made alkaline with somewhat more than the amount of caustic soda solution corresponding to the added acid, and exhaustively extracted with methylene chloride in an extractor. After evaporating the methylene chloride there remain behind 76 parts of practically pure 2-aminopyrimidine.

*Example 4*

76 parts of thiourea are introduced into a solution of 120 parts of sodium methylate in 360 parts of methanol. Without waiting for the complete dissolution of the thiourea, 148 parts of beta-phenoxyacrolein (prepared as described in Example 1) are allowed to flow in during the course of about 75 minutes and the whole then heated for 24 hours under reflux. The resultant solution is concentrated to a syrupy consistency. By acidifying the syrup with about 350 parts of 6.35-normal hydrochloric acid, crude 2-mercaptopyrimidine is precipitated. It is purified by sublimation. 55 parts of 2-mercaptopyrimidine of the melting point 228° to 229° C. are thus obtained.

*Example 5*

2 parts of triethylamine or pyridine are added to a solution of 190 parts of phenol in 200 parts of ether contained in an agitator fitted with a reflux condenser and then 136 parts of 1-butin-3-one are run in over 50 minutes with stirring which causes the temperature of the mixture to rise. The feed of the 1-butin-3-one is controlled to prevent the ether from boiling too violently, cooling being resorted to, if required. The reaction mixture is allowed to stand for several hours at ordinary temperature and then subjected to fractional distillation. There are obtained 195 parts of β-phenoxyvinylmethyl ketone having a boiling point of 150° to 156° C. at a pressure of 20 Torr.

90 parts of the said ketone are allowed to flow into a solution of 50 parts of guanidine carbonate and 45 parts of sodium hydroxide in a mixture of 316 parts of water and 50 parts of ethanol by small portions with stirring, cooling being provided to prevent the temperature from rising above 30° C. After a short time crystals begin to settle out. Stirring is continued for 10 hours at ordinary temperature. The crystals are then filtered off by suction and 16.5 parts are obtained. Another 22 parts thereof are obtained by extracting the filtrate with methylene chloride. The 2-amino-4-methylpyrimidine thus obtained melts at 159° to 161° C. after recrystallization from ethanol or sublimation under high vacuum.

*Example 6*

Into a solution of 92 parts of phenol in 200 parts of ether contained in an agitator fitted with a reflux condenser, after adding 2 parts of triethylamine or pyridine, a solution of 65 parts of 3-phenyl-1-propin-3-one is run by portions, which causes the mixture to boil.

When the reaction has abated, the reaction mixture is allowed to stand overnight and then subjected to fractional distillation. After removing the excess of phenol by distillation 60 parts of β-phenoxyvinylphenyl ketone are obtained having a boiling point of 208° to 212° C. at a pressure of 14 Torr.

A solution of 30 parts of the said ketone in 50 parts of ethanol is added to a solution of 12.5 parts of guanidine carbonate and 11 parts of sodium hydroxide in 75 parts of water. The mixture which takes on a red-orange coloration is heated for about 30 minutes on the waterbath. The crystals which separate out are filtered off by suction after cooling. From the filtrate only some more of the same product can be obtained by extraction with methylene chloride. By recrystallization from ethanol or sublimation under high vacuum 12 parts of pure 2-amino-4-phenylpyrimidine with a boiling point of 165° to 167° C. are obtained.

*Example 7*

81 parts of β-phenoxyvinylmethyl ketone prepared as described in section 1 of Example 5, are allowed to run into a solution of 38 parts of thiourea in 200 parts of a 30 percent solution of sodium methylate in methanol with stirring and cooling during 30 minutes. Stirring is continued for 12 hours at ordinary temperature, the mixture becoming highly viscous. The 2 - mercapto - 4 - methylpyrimidine is precipitated by acidifying the mixture with 2 N hydrochloric acid until the reaction mixture is acid to Congo paper. The 2 - mercapto - 4 - methylpyrimidine is filtered off by suction, washed free of salt with a little water and dried under reduced pressure. The yield is 43 parts. After recrystallization from ethanol, the 2-mercapto-4-methylpyrimidine forms yellowish crystals which melt at 216° to 220° C. with decomposition.

What we claim is:

1. The method which comprises reacting an acetylenic compound of the general formula

X—C≡C—CO—Y in which X and Y represent members of the class consisting of hydrogen, lower alkyl and phenyl radicals in the presence of from about 0.1 to 10 percent by weight, with reference to the acetylenic compound, of a basic tertiary amine with an aromatic hydroxy compound selected from the class consisting of phenol and its derivatives containing at least one of the substituents alkyl, halogen, nitro, hydroxy and dialkylamino, and then allowing the beta-aryloxy-vinyl-alpha-carbonyl compound thus obtained to react, in the presence of a condensing agent, with a compound containing the monovalent radical

—C(=NH)—NH₂

2. The method which comprises reacting an acetylenic compound of the general formula

X—C≡C—CO—Y in which X and Y represent members of the class consisting of hydrogen, lower alkyl and phenyl radicals in the presence of from about 0.1 to 10 percent by weight, with reference to the acetylenic compound, of a basic tertiary amine with an aromatic hydroxy compound selected from the class consisting of phenol and its derivatives containing at least one of the substituents alkyl, halogen, nitro, hydroxy and dialkylamino, and then allowing the beta-aryloxy-vinyl-alpha-carbonyl compound thus obtained to react, in the presence of a strong inorganic acid, with a compound containing the monovalent radical

—C(=NH)—NH₂

3. The method which comprises reacting an acetylenic compound of the general formula

X—C≡C—CO—Y in which X and Y represent members of the class consisting of hydrogen, lower alkyl and phenyl radicals in the presence of from about 0.1 to 10 percent by weight, with reference to the acetylenic compound, of a basic tertiary amine with an aromatic hydroxy compound selected from the class consisting of phenol and its derivatives containing at least one of the substituents alkyl, halogen, nitro, hydroxy and dialkyamino, and then allowing the beta-aryloxy-vinyl-alpha-carbonyl compound thus obtained to react, in the presence of a condensing agent selected from the group consisting of an alkali metal and an alcoholate, with a compound containing the monovalent radical

—C(=NH)—NH$_2$

4. The method as claimed in claim 3 wherein the amount of the condensing agent is from about 2 to about 3.2 mols to 1 mol of the aryloxy vinyl compound.

5. The method which comprises reacting an acetylenic compound of the general formula

HC≡C—CO—Y wherein Y is a member of the class consisting of hydrogen, methyl and phenyl in the presence of from about 0.1 to 10 percent by weight, with reference to the acetylenic compound, of a basic tertiary amine with phenol and then allowing the beta-phenoxy-vinyl-carbonyl compound thus obtained to react, in the progress of from 2 to 3.2 mols with reference to 1 mol of said vinyl derivative, of a condensing agent selected from the group consisting of an alkali metal hydroxide and an alcoholate with a compound containing the monovalent radical

—C(=NH)—NH$_2$

6. A method as claimed in claim 5 wherein Y is H and the radical

—C(=NH)—NH$_2$ belongs to guanidine.

7. A method as claimed in claim 5 wherein Y is methyl and the radical

—C(=NH)—NH$_2$ belongs to guanidine.

8. A method as claimed in claim 5 wherein Y is phenyl and the radical

—C(=NH)—NH$_2$ belongs to guanidine.

9. A method as claimed in claim 6 wherein the reaction of the aryloxyvinyl compound on guanidine is carried out between 15° C. and waterbath temperature.

10. A method as claimed in claim 5 wherein the radical

—C(=NH)—NH$_2$ belongs to thiourea.

11. A method as claimed in claim 10 wherein Y is methyl and the condensing agent is an alkali metal alcoholate.

References Cited in the file of this patent
UNITED STATES PATENTS 2,375,735   Moss ------------------ May 8, 1945

UNITED STATES PATENT OFFICE
CERTIFICATE OF CORRECTION

Patent No. 2,913,462                                      November 17, 1959

Hermann Spaenig et al.

It is hereby certified that error appears in the printed specification of the above numbered patent requiring correction and that the said Letters Patent should read as corrected below.

Column 2, line 44, for "boiling point 130°" read -- boiling point 130° to 136° --; column 5, line 12, after "metal" insert -- hydroxide --; line 28, for "progress" read -- presence --.

Signed and sealed this 7th day of June 1960.

(SEAL)
Attest:

KARL H. AXLINE                                                 ROBERT C. WATSON

Attesting Officer                                            Commissioner of Patents